US012466345B2

(12) United States Patent
Dubrulle (10) Patent No.: US 12,466,345 B2
(45) Date of Patent: Nov. 11, 2025

(54) SYSTEM FOR FORMALLY SUPERVISING COMMUNICATIONS

(71) Applicant: COMMISSARIAT A L'ENERGIE ATOMIQUE ET AUX ENERGIES ALTERNATIVES, Paris (FR)

(72) Inventor: Paul Dubrulle, Paris (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 79 days.

(21) Appl. No.: 17/415,477

(22) PCT Filed: Dec. 19, 2019

(86) PCT No.: PCT/FR2019/053201
§ 371 (c)(1),
(2) Date: Jun. 17, 2021

(87) PCT Pub. No.: WO2020/128363
PCT Pub. Date: Jun. 25, 2020

(65) Prior Publication Data
US 2022/0250560 A1  Aug. 11, 2022

(30) Foreign Application Priority Data

Dec. 20, 2018  (FR) ...................... 18 73585

(51) Int. Cl.
*G06F 3/00* (2006.01)
*B60R 16/023* (2006.01)
(Continued)

(52) U.S. Cl.
CPC .......... *B60R 16/0232* (2013.01); *G06F 9/448* (2018.02); *G06F 9/54* (2013.01)

(58) Field of Classification Search
CPC ........................................................ G06F 9/54
(Continued)

(56) References Cited

U.S. PATENT DOCUMENTS 6,226,373 B1 * 5/2001 Zhu ...................... H04Q 3/0045
379/207.02
6,728,685 B1 * 4/2004 Ahluwalia .......... G06Q 30/0635
705/26.81

(Continued)

OTHER PUBLICATIONS

Abdurrahman Pektaş, Malware classification based on API calls and behaviour analysis. (Year: 2017).*

(Continued)

*Primary Examiner* — Lechi Truong
(74) *Attorney, Agent, or Firm* — Oblon, McClelland, Maier & Neustadt, L.L.P.

(57) ABSTRACT

A system is provided for formally monitoring communications of a set of specific applications of a platform. The system includes an acquisition module configured to acquire a formal model of a data stream describing the behaviour of a group of participants modelling the set of specific applications, and a communication specification describing software implementations implementing the applications modelled by the participants. The software implementations are configured to call up predetermined communication functions, and a monitoring module is configured to verify that a sequence for calling up the communication functions complies with the expected behaviour of the group of participants.

12 Claims, 3 Drawing Sheets

(51) Int. Cl.
   *G06F 9/448* (2018.01)
   *G06F 9/54* (2006.01)
(58) Field of Classification Search
   USPC .......................................................... 719/328
   See application file for complete search history.

(56) References Cited

U.S. PATENT DOCUMENTS

| | | | | |
|---|---|---|---|---|
| 7,900,194 | B1* | 3/2011 | Mankins | G06F 21/554 |
| | | | | 726/25 |
| 8,015,235 | B1* | 9/2011 | Bauer | G06F 9/5061 |
| | | | | 709/201 |
| 8,984,490 | B1 | 3/2015 | Dahan | |
| 9,170,912 | B1* | 10/2015 | Hu | G06F 1/3203 |
| 9,684,524 | B1* | 6/2017 | Porter | G06F 11/3452 |
| 9,852,294 | B1* | 12/2017 | Zhu | G06F 21/562 |
| 10,841,366 | B2* | 11/2020 | Zhang | G06F 9/4494 |
| 2002/0116083 | A1* | 8/2002 | Schulze | H01L 22/20 |
| | | | | 700/121 |
| 2004/0044608 | A1* | 3/2004 | Young | G06Q 40/04 |
| | | | | 705/36 R |
| 2004/0111390 | A1* | 6/2004 | Saito | G06F 11/1435 |
| 2004/0264367 | A1* | 12/2004 | Edwards | G06F 8/433 |
| | | | | 370/229 |
| 2009/0048008 | A1* | 2/2009 | Kemmerling | A63F 13/47 |
| | | | | 463/43 |
| 2009/0271139 | A1* | 10/2009 | Shin | G06F 11/3684 |
| | | | | 702/108 |
| 2010/0229158 | A1* | 9/2010 | Ike | G06F 11/3461 |
| | | | | 717/128 |
| 2011/0191303 | A1* | 8/2011 | Kaufman | G06F 7/00 |
| | | | | 707/684 |
| 2013/0212234 | A1* | 8/2013 | Bartlett | G06Q 10/0633 |
| | | | | 709/220 |
| 2013/0290936 | A1* | 10/2013 | Rhee | G06F 11/3604 |
| | | | | 717/128 |
| 2014/0040855 | A1* | 2/2014 | Wang | G06F 30/327 |
| | | | | 717/107 |
| 2014/0045518 | A1* | 2/2014 | Sathyan | H04W 4/023 |
| | | | | 455/456.1 |
| 2014/0236579 | A1* | 8/2014 | Kurz | G06F 40/284 |
| | | | | 704/9 |
| 2015/0199249 | A1 | 7/2015 | Dahan | |
| 2017/0039039 | A1 | 2/2017 | Johnson et al. | |
| 2017/0344672 | A1* | 11/2017 | Gould | G06F 11/3672 |
| 2019/0138428 | A1* | 5/2019 | Sumitomo | G06F 11/3616 |
| 2020/0372315 | A1* | 11/2020 | Jablonski | G01S 11/04 |
| 2021/0248514 | A1* | 8/2021 | Cella | G06V 20/20 |
| 2021/0342836 | A1* | 11/2021 | Cella | H04L 9/3239 |
| 2022/0058072 | A1* | 2/2022 | Poghosyan | G06F 11/3476 |
| 2022/0188084 | A1* | 6/2022 | Goswami | G06F 8/427 |

OTHER PUBLICATIONS

Mithun Acharya, Mining API Error-Handling Specifications from Source Code. (Year: 2009).*
Martin P. Robillard, Automated API Property Inference Techniques. (Year: 2013).*
Hoan Anh Nguyen, A Graph-based Approach to API Usage Adaptation. (Year: 2010).*
J. H. Christensen, Structuring Design Cornputations (Year: 1969).*
Hoda Naghibijouybari, Rendered Insecure: GPU Side Channel A!acks are Practical. (Year: 2018).*
Barthel' emy Dagenais, Recovering Traceability Links between an API and Its Learning Resources (Year: 2012).*
International Search Report issued on Mar. 23, 2020 in PCT/FR2019/053201 filed on Dec. 19, 2019, 2 pages.
Preliminary French Search Report issued on Aug. 27, 2019 in French Patent Application No. 18 73585 filed on Dec. 20, 2018 (with translation of category of cited documents), 2 pages.
Do et al., "Transaction Parameterized Dataflow: A Model for Context-Dependent Streaming Applications", Design, Automation & Test in Europe Conference & Exhibition (DATE), Mar. 2016, Dresden, Germany, 7 pages.
Wei et al., "A Dataflow Programming Language and Its Compiler for Streaming Systems", Procedia Computer Science, ICCS 2014, 14th International Conference on Computational Science, Elsevier, 2014, vol. 29, pp. 1289-1298.
Cedersjö et al., "Software Code Generation for Dynamic Dataflow Programs", Proceedings of the 17th International Workshop on Software and Compilers for Embedded Systems (SCOPES 2014), 2014, ACM, New York, NY, US, pp. 31-39.
"Explanation of ara::com API", AUTOSAR, Document Identification No. 846, AUTOSAR AP Standard Release 17-03, 2017, 74 total pages.
"Specification of Time Synchronization for Adaptive Platform", AUTOSAR, Document Identification No. 880, AUTOSAR AP Standard Release 17-10, 2017, pp. 1-91.

* cited by examiner

SYSTEM FOR FORMALLY SUPERVISING COMMUNICATIONS

The present invention relates to a system for formally supervising communications of a set of concrete applications, and more particularly in a service-oriented architecture.

STATE OF PRIOR ART

The present invention applies to systems in which concrete applications use predefined interface functions to exchange data with each other. In particular, the invention applies to such systems in which compliance with the expected behaviour of some tasks is considered as critical, namely in the event of non-compliance, there may be very negative consequences. Generally speaking, the invention applies to systems in which tasks of different levels of criticality coexist, some tasks being considered as having to strictly comply with the expected behaviour, others for which deviations in behaviour are temporarily acceptable, or still others without any guarantee on the behaviour. These are known as mixed criticality systems.

Recent real-time on-board systems for autonomous vehicles are an example of such systems. New on-board architectures for vehicles are distributed and heterogeneous, and the paradigm used to program them is service-oriented. Deviating from the expected behaviour for a critical task could cause a malfunction that can be quite hazardous. On the other hand, some tasks related to comfort or driving experience do not really have constraints on their behaviour, so they are mixed criticality systems.

It is therefore important to have a tool that allows a formal specification of such a system to be made, and a formal verification of the conformity of an implementation of the specified system to be done.

However, the specification of such systems, taking into account all the constraints, is a very complex technical problem. Then comes the work of allocating resources for an implementation of the specified system, and verifying that these resources are sufficient for the implementation to work as agreed with its specification.

There are formal model-based algorithms to specify reconfigurable real-time dataflow systems. One such method is described for example in document [1]. This method makes it possible to verify the resources required for the implementation and the absence of interlocking between actors. However, it does not allow during its execution the conformity of the behaviour of an implementation of the specified system with its specification to be verified.

Another problem is the implementation of a specified system in the formal methodology. This involves developing software that implements the concrete application modelled by each actor, and using the communication interfaces in this software to perform the formally specified communications. This implementation requires configuring the software elements implemented for communication between the interfaces so that these communications are in accordance with the formal specification.

There are many languages and programming interfaces for writing software for this kind of systems and in particular for service-oriented systems. However, they are all based on similar concepts, namely publication of data by a server and subscription to that data by one or more clients, or the emission of requests by one or more clients to a server in charge of performing the required processing. Connections between clients and servers may change during the lifetime of the system, and time constraints are sometimes imposed to ensure proper operation of the system.

Documents [2, 3] describe languages for writing software that implements dataflow actors, and associated compilers that generate code so as to perform the behaviour of the specified system.

However, this software is limited in the context considered because they do not allow the expression of all the constraints of a formal specification and, for the most part, the targeted software architectures are not adapted for mixed criticality systems. Furthermore, in the scope of a development model where various software producers implement actor specifications, to provide them to a same integrator, it is extremely difficult for the integrator to impose the use of a specific language.

The object of the present invention is therefore to provide a system for formally supervising communications of a set of applications that overcomes the aforementioned drawbacks, in particular by allowing the integration of software implementations written in any language on a heterogeneous distributed platform.

DISCLOSURE OF THE INVENTION

The present invention relates to a system for formally supervising the communications of a set of concrete applications of a platform, comprising:
- an acquisition module configured to acquire a formal model of a data stream comprising a set of actors exchanging quantifiable information with each other through unidirectional communication channels, said formal model describing the behaviour of said set of actors modelling said set of concrete applications, and a communication specification describing software implementations implementing the applications modelled by said actors, said software implementations being configured to make calls to predetermined communication functions relating to the programming interface of said platform, and
- a supervisory module configured to verify that a sequence of calls to said communication functions is in accordance with the expected behaviour of said set of actors.

Thus, the supervisory module can be aware of all possible and expected behaviours (and not only a predetermined scenario among the many possible ones) and allows to apply corrective actions in case of detection of aberrant behaviour. Further, this system allows the integration of software implementations written in any language on a heterogeneous distributed platform exhibiting communication behaviour in accordance with that specified in the formal model, without the need to modify the software implementing the actors. The software implementations can be on-board online in an operational environment.

According to a preferred embodiment of the present invention, the supervisory module is configured to construct an automaton for each software implementation corresponding to an actor, each automaton comprising a set of states whose transition from one state to another is triggered by a call from the software implementation to one of said communication functions, said automaton being based on the behaviour expected by the formal model to trace the valid call sequences to said communication functions of the software implementation.

Advantageously, each automaton comprises a first part associated with the initialisation of the software implementation and a second part associated with the operation of the software implementation, transition from a final state of said first part to an initial state of said second part is triggered when a synchronisation signal is received by the software implementation, indicating execution of a concrete application on the platform.

Advantageously, the supervisory module is configured to generate software elements configured to capture communication function calls and to make sure that the sequence of calls made upon executing a concrete application corresponds to the sequence defined by the automaton.

Advantageously, the software elements comprise an extended function for each of the communication functions, an input data due date management function, and a current activation management function.

Advantageously, the communication specification is a specification of a service-oriented implementation.

Advantageously, the communication functions are service-oriented and comprise a service offer function, an interface publication function, a published interface subscription function, an emission function, a reception function, a request function, and an interface processing function.

Advantageously, the formal model comprises a set of configuration data required for the implementation of said actors, thus allowing the expected behaviour of an on-board system to be described.

Advantageously, the configuration data include for each of the actors: budget, initial delay, initial deadline, input deadline, default input policy, persistent/ephemeral indicator, and strict/released indicator data.

Advantageously, the communication specification includes links between the software implementations and the actors of the formal model.

The invention is also directed to a real-time on-board equipment, designed using the supervisory system according to any of the preceding characteristics, said on-board equipment being configured to receive measurements specific to its environment and to deliver results actuating functional operations.

Advantageously, said equipment is an autonomous or non-autonomous vehicle of the land, rail, aerospace or naval type.

The invention is also directed to a method for formally supervising communications of a set of concrete applications, comprising the following steps of:
  acquiring a formal model of a data stream comprising a set of actors exchanging quantifiable information with each other through unidirectional communication channels, said formal model describing the behaviour of a set of actors modelling said set of concrete applications, and a communication specification describing software implementations implementing the applications modelled by said actors, said software implementations being configured to make calls to predetermined communication functions relating to the programming interface of said platform, and
  verifying that a sequence of calls to said communication functions is in accordance with the expected behaviour of said set of actors.

BRIEF DESCRIPTION OF THE FIGURES

Further features and advantages of the device and method according to the invention will become clearer upon reading the description given below, by way of indicating and in no way limiting purposes, with reference to the appended drawings in which.

DETAILED DESCRIPTION OF THE INVENTION

The principle of the present invention is to supervise data exchanges between computational tasks implementing components specified in a formal methodology in order to observe data exchanges in accordance with the formal specification.

Figure 1:
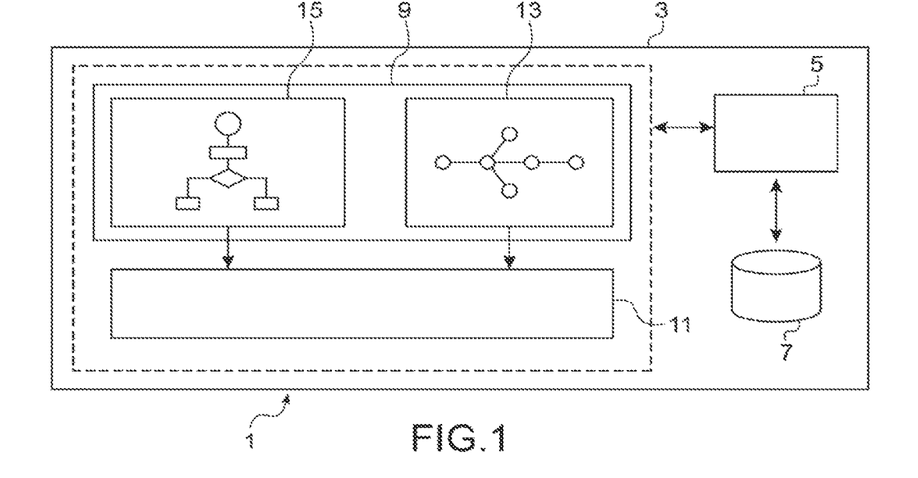
FIG. 1 schematically illustrates a system for formally supervising communications of a set of concrete applications of a platform, according to one embodiment of the invention.

FIG. 1 schematically illustrates a system for formally supervising communications of a set of concrete applications of a platform, according to one embodiment of the invention.

The formal supervisory system 1 is implemented by hardware means comprising an information processing machine such as a calculator or computer 3 comprising a microprocessor 5 and memories 7. The microprocessor 5 is configured to execute one or more computer programs comprising program code instructions, stored in the memories 7 of the computer and designed to implement the system for formally supervising communications of a set of applications.

The supervisory system aims at performing formal supervision of communications of a set of concrete applications of a platform. In accordance with the invention, the supervisory system comprises an acquisition module 9 and a supervisory module 11.

The acquisition module is configured to acquire a formal model 13 of a data stream describing the behaviour of a set of actors modelling the set of concrete applications. Furthermore, the acquisition module 9 is configured to acquire a communication specification 15 describing software implementations implementing applications modelled by the actors. The software implementations are configured to make calls to predetermined communication functions.

The supervisory module 11 is configured to verify that a sequence of calls to the communication functions is in accordance with the expected behaviour of the set of actors.

The formal model 13 of a data stream comprises independent actors exchanging quantifiable information with each other through unidirectional communication channels. Actors can be software entities (for example applications) and/or hardware entities (for example sensors, cameras, probes, microprocessors, etc.). Each actor is configured to wait until it has received a statically specified amount of data on its input channels in order to consume that amount of data, to perform (or not) processing of that data, and to produce a statically specified amount of data on its output channels to new actors, and each repeating this behaviour indefinitely. The consumption/processing/emission process is commonly referred to as an activation.

Each activation takes place according to predefined reconfigurations, and for a given reconfiguration, the activation will either consume/process/produce (so-called execute) or do nothing (so-called pass), and the choice to change configuration is unpredictable.

Each actor activates according to the predefined reconfigurations in time (called real-time) windows with possible frequency constraints (or equivalently with period constraints).

Furthermore, the communication specification 15 includes information on the applications, the services they offer, the services they use, the type of data that will transit on the channels, information on interactions between the different applications, the link or correspondence between the applications of the platform and the actors of the formal model, etc.

The supervisory module 11 is a code generation tool that takes as input the configuration coming from the formal methodology (i.e. formal model 13) and the description of the applications of the communication specification 15, and automatically generates a supervision software layer in charge of observing the communications carried out by the implementations of the actors, and possibly correcting deviations from the formal specification.

The supervisory system 11 according to the invention thus provides means to automatically integrate actor implementations, written in any existing language, on a heterogeneous distributed platform.

The potential applications of this supervisory system are numerous, given that targeted architectures are used in many fields such as the Internet, automobile, aviation, meteorology, etc.

In particular, the invention applies to a heterogeneous distributed platform for an on-board system or device where the compliance to the expected behaviour is considered very important for the safety and proper functioning of the equipment provided with such a system.

Recent real-time on-board systems for autonomous vehicles are an example of such systems where entities provide generic interfaces to allow concrete applications to exchange data with each other, each application being independent and running on a computer of a distributed architecture. The connections between applications can be reconfigured according to the current operating mode of the vehicle, and/or the availability of services.

In the following, the invention will be described in detail by referring to a system modelled by a formal model comprised of a set of actors and by giving a description of the behaviour expected by the model.

Figure 2:
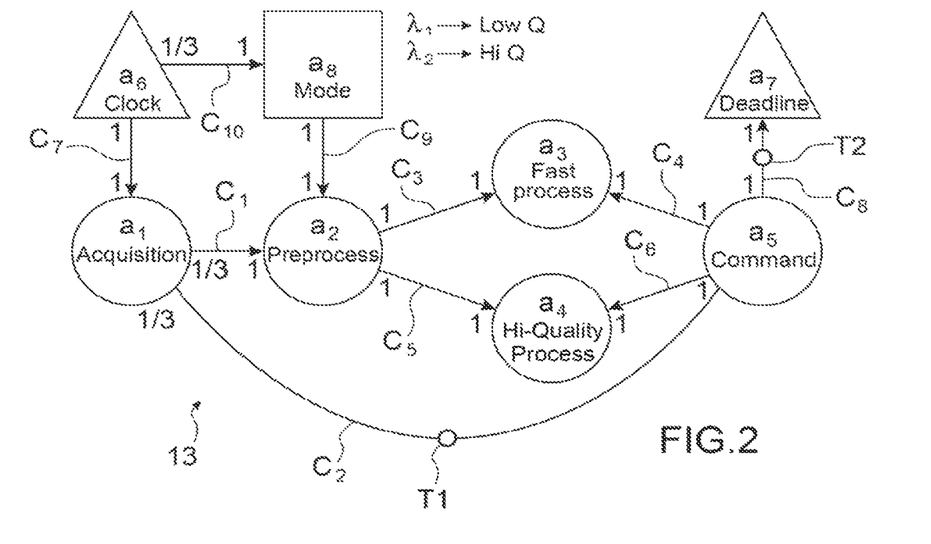
FIG. 2 schematically illustrates an example of a formal model defined by a graph according to one embodiment of the invention.

Indeed, FIG. 2 schematically illustrates an example of a formal model defined by a graph according to one exemplary embodiment of the invention.

According to this example, the formal model 13 comprises an "Acquisition" actor acquiring data supplied by a sensor at 30 Hz and a "Command" actor sending a command to an actuator at 10 Hz. The command is determined according to the result of a reconfigurable processing chain consisting of a "Preprocess" actor carrying out a pre-processing of the data in all possible reconfigurations, and in one reconfiguration, a "Fast Process" actor carrying out a fast and low definition processing of the pre-processed data, and in the other reconfiguration, a "Hi-Quality Process" actor carrying out a slow and high definition processing. The choice of the current reconfiguration is made by a "Mode" actor which preferably uses high-definition processing when available.

The graph models a data stream with frequency constraints, different reconfiguration modes and initial data available for initial consumption. The circles $a_1$-$a_5$ represent so-called generic actors that perform processing on the data. These generic actors $a_1$-$a_5$ are thus adapted to consume data, perform calculations to transform the data and produce results. The triangles $a_6$ and $a_7$ represent actors called "Clock" $a_6$ or "Deadline" $a_7$ which produce and consume data with frequency constraints. The square a8 represents a "Mode" actor $a_8$ in charge of signalling reconfigurations. The directed arcs $c_1$-$c_{10}$ are unidirectional channels each indicating a data stream between two actors and the associated numerical values giving the amount of data produced or consumed on the channel.

According to this example, the modelled system is comprised of five generic actors $a_1$-$a_5$ (Acquisition $a_1$, Preprocess $a_2$, Fast Process $a_3$, Hi-Quality Process $a_4$ and Command $a_5$) two temporal actors $a_6$ and $a_7$ (Clock and Deadline) and one Mode actor $a_8$. The "Acquisition" actor $a_1$ acquires data provided by the clock actor $a_6$ at 30 Hz. The Command actor $a_5$ sends a command to the Deadline actuator actor $a_7$ at 10 Hz. The command is determined according to the result of a reconfigurable processing chain consisting of another generic "Preprocess" actor $a_2$ performing a preprocessing of the data produced by the acquisition actor $a_1$ in all possible reconfigurations. In a first configuration (mode noted by $\lambda_1$), the "Fast Process" actor $a_3$ (fast actor) performs fast and low definition processing of the data preprocessed by the preprocessing actor $a_2$. In the second reconfiguration (mode denoted by $\lambda_2$), the "Hi-Quality Process" actor $a_4$ (slow actor) performs slow but high definition processing. Thus, the data processing path of the first configuration $\lambda_1$ is the path connecting the acquisition actor $a_1$ to the preprocessing actor $a_2$, to the fast processing actor $a_3$ and then finally to the control actor $a_5$. The second configuration $\lambda_2$ is defined by the path connecting the acquisition actor $a_1$ to the preprocessing actor $a_2$, to the slow processing actor $a_4$ and then finally to the control actor $a_5$. Thus, the configuration propagates from one actor to another and therefore no centralized synchronisation on these reconfiguration modes is necessary. Each actor will communicate to its neighbour the configuration mode in which it should operate. The choice of the current configuration is made by the mode actor $a_3$ which preferably uses high definition processing when available.

According to this example, the fast processing actor a3 consumes a piece of data on its input channel $c_3$ (represented on channel $c_3$ by a "1") and produces a piece of data on its output channel $c_4$ (represented on channel $c_4$ by a "1") each time it is activated. The same applies to the slow processing actor $a_4$, which consumes a piece of data on its input channel $c_5$ and produces a piece of data on its output channel $c_6$. The control actor $a_5$ consumes a piece of data on its first input channel $c_4$ or on its second input channel $c_4$ (depending on the configuration mode) and produces a piece of data on its output channel $c_2$ each time it is activated. The pre-processing actor $a_2$ consumes a piece of data on its first input channel $c_1$ and a piece of data on its second input channel $c_9$ each time it is activated, and produces a piece of data on its first output channel $c_3$ or on its second output channel $c_5$ (depending on the configuration mode).

On the other hand, the acquisition actor $a_1$ consumes a rational number of data on its input channel $c_2$ (represented on the input channel $c_2$ by the value "⅓") and produces a rational number of data on its output channel $c_1$ (represented on the output channel c1 by the value "⅓"). This means that the acquisition actor $a_1$ consumes or produces a piece of data every three activations. The example in FIG. 2 shows that in the initial state, there is a token T1 (i.e. a piece of data) available on channel $c_2$ (between the control actor a5 and the acquisition actor $a_1$). Then, the acquisition actor $a_1$ will consume this existing piece of data on this channel $c_2$ and will produce a piece of data on its output channel $c_1$ (i.e. the channel $c_1$ connecting the acquisition actor $a_1$ to the pre-processing actor $a_2$). Thus, the acquisition actor $a_1$ has consumed a piece of data and produced a piece of data. However, on its next two activations, it will consume zero data and produce zero data. In other words, the acquisition actor $a_1$ consumes a piece of data and produces a piece of data every three activations. This makes it possible to synchronise data between two actors operating at different frequencies without any loss of data. Indeed, according to this example, the acquisition appears three times for each command, thus allowing the transfer of data between the acquisition actor $a_1$ operating at 30 Hz and the command actor a5 operating at 10 Hz without any loss of data.

In the following, the elements defining the formal model 13 are summarised with reference to the example in FIG. 2. According to this formalism, the specification of a data stream consists of the following elements F1-F9:

F1: The set of generic actors $a_1$-$a_5$ that process data, and the set of mode actors $a_6$ and a7 that process data and/or select configuration modes are defined.

F2: The set of channels $c_1$-$c_{10}$ connecting the actors to each other is defined, each actor being associated with at least one input or output channel.

F3: The number of data produced or consumed by each actor for each of its input or output channels is defined, with the advantage that it is possible for a channel to have only one of these numbers be a rational number. These numbers are represented by the values on the arcs $c_1$-$c_{10}$ connecting the actors.

F4: For each mode actor $a_8$ of a non-empty set of modes, the mode actor $a_8$ being in charge of dynamically choosing one and only one of these modes for each of its activations (these modes are noted $\lambda_1$ and $\lambda_2$). The choice of the current configuration is advantageously made by a single $a_8$ mode actor and this current configuration is propagated in a distributed manner from one actor to another.

F5: For each generic actor a1-a5, the set of modes in which it executes, and the implicit set of all other modes through which it passes are defined. It will be noted that the set of modes in which a generic actor executes is either a nominal mode common to the whole system, or a subset of the modes chosen by mode actors. In the example of FIG. 2, all actors except the preprocessing $a_2$, fast processing $a_3$ and slow processing $a_4$ actors execute in the nominal mode insofar as the preprocessing actor $a_2$ executes in modes $\lambda_1$ and $\lambda_2$, the fast processing actor $a_3$ executes in mode $\lambda_1$, and the slow processing actor $a_4$ executes in mode $\lambda_2$.

F6: Given the different modes, an implicit set of feedback channels is defined as the set of channels connecting two generic actors each executing in at least one of the modes chosen by the same mode actor, and such that there is a non-repeating path starting from the mode actor and ending with the producing actor on that channel, passing through a consuming actor.

F7: Maximum frequency constraints are defined for some generic or mode actors. One possible way of expressing them is by so-called clock actors $a_6$ with which a frequency is associated. In the example in FIG. 2, the acquisition actor $a_1$ has a maximum frequency constraint of 30 Hz, expressed by the clock actor $a_6$ with a frequency of 30 Hz, and the arc $c_7$ connecting them and the associated amounts of data.

F8: Minimum frequency constraints are defined for some generic or mode actors. One possible way of expressing them is by means of so-called deadline actors $a_7$, to which we associate a frequency. In the example in FIG. 2, the control actor a2 has a minimum frequency constraint of 10 Hz, expressed by the deadline actor $a_7$ with a frequency of 10 Hz, the arc $c_8$ connecting them and the associated amounts of data. It will be noted that the same actor can be constrained to operate at a minimum and maximum frequency, in which case it is an exact frequency constraint. In other words, a frequency constraint is either maximum (no more than a number of times per second), minimum (at least a number of times per second) or exact (exactly a number of times per second).

F9: An initial state of the system comprised per channel of a rational number and a sequence of modes with a length equal to this rational number rounded down to the nearest whole number, and per generic actor of its initial mode. In the example of FIG. 2, all actors have the nominal mode as their initial mode, and the channels marked with a small circle T1 and T2 have an initial state of value "1". Of course, the initial state can be expressed by any rational number (for example ⅖; 4/3; etc.) and this results from the fact that the production and consumption rates are rational according to one advantageous embodiment of the invention.

The following table Tab. 1 gives by way of example the configuration data required for an implementation of the formal model 13 of FIG. 2.

TABLE 1

| Actor | Acquisition | Preprocess | Fast process | Hi-Quality Process | Command |
|---|---|---|---|---|---|
| Budget (ms) | 10 | 30 | 30 | 40 | 20 |
| Initial delay (ms) | 0 | 0 | 0 | 0 | 0 |
| Initial deadline (ms) | 0 | 0 | 0 | 0 | 110 |
| Input deadline (ms) | 5 | 20 | 50 | 50 | 90 |
| Default input policy | Ignore | Previous | Ignore | Ignore | Previous |
| Persistent/Ephemeral | Persistent | Persistent | Persistent | Persistent | Persistent |
| Strict/Relaxed | Strict | Strict | Strict | Strict | Strict |

The first row represents the five generic actors: Acquisition $a_1$, Preprocess $a_2$, Fast Process $a_4$, Hi-Quality Process $a_4$ and Command $a_5$ actors.

The second, third, fourth, and fifth rows indicate values in ms, of a budget, an initial delay, an initial deadline, and an input deadline respectively. The sixth, seventh, and eighth lines indicate a default input policy, a persistent/ephemeral indicator, and a strict/relaxed indicator.

The values are usually imposed by the platform integrator and are given here as examples only. The budget designates the duration in ms allocated to each actor to do its different tasks. The initial delay and the initial deadline indicate the time needed for the communication and production of the samples in order to take the routing and processing of the different samples into account. An initial delay of zero means that there is no forced latency constraint and the actor starts as soon as it is ready. The input deadline designates the arrival deadline for data consumed by actor implementations and thus allows an actor to be allocated a waiting time to wait for its intended data before starting work.

The default input policy in this example refers to two types of policies. When there is no input data, the "Ignore" policy does not produce replacement data, and the "Previous" policy copies the last input received. Alternatively, a third "Default" policy can be set up which systematically produces a same default value.

Another input configuration piece of data can possibly relate to whether a lack of production is designated as a fault or not. In the example of FIG. 2, only the absence of output from the Command actor to the Acquisition actor is not considered as a fault, as the calibration request is not mandatory.

Furthermore, in the following description, a formal communication supervisory system in a service-oriented architecture will be more particularly discussed. In other words, the communication specification 15 is a specification of a service-oriented implementation and the communication functions are service-oriented functions.

As an example, it is considered that the service-oriented architecture is comprised of three services: AcquisitionService, PreprocessService, and ProcessService. Each service provides the following interfaces:

AcquisitionService publishes an AcquisitionService::Samples interface producing sensor samples, and offers an AcquisitionService::Calibrate interface to process calibration requests;

PreprocessService publishes an interface producing the pre-processed samples, and to implement reconfigurations, this interface is duplicated into PreprocessService::Samples1 and PreprocessService::Samples2 interfaces, which will be used according to the current reconfigurations; and ProcessService publishes a ProcessService::Samples interface producing the samples processed.

The implementations of each service are identified by a unique identifier. There is an implementation Acq1 of AcquisitionService, an implementation Pre1 of PreprocessService, and two implementations Proc1 and Proc2 of ProcessService. There is also a client-only implementation Com1. The link between these implementations and the actors in the model is given in the following Table 2.

TABLE 2

| Software implementation | Model actor |
| --- | --- |
| Acq1 | Acquisition |
| Pre1 | Preprocess |
| Proc1 | Fast Process |
| Proc2 | High-quality Process |
| Com1 | Command |

The software implementing the five actors of the model can be made by different software providers. This software makes calls to communication functions to establish service-oriented communications.

As an example, the communication functions relating to the programming interface of the Adaptive automotive platform AutoSAR described in documents [4, 5] are described below. These communication functions include a service offering function (OfferService), an interface publishing function (PublishInterface), a published interface subscribing function (SubscribeInterface), an emission function (Emit), a receiving function (Receive), a request function (Request), and an interface processing function (Process).

The OfferService function (service identifier) enables the calling software to be identified as the implementation associated with the identifier.

The PublishInterface (interface identifier) function allows the calling software to give access to the interface associated with the identifier for other software.

The SubscribeInterface (service identifier, interface identifier) function allows the calling software to receive data emitted by the software associated with the service identifier through the interface associated with the interface identifier.

The Emit (interface identifier, piece of data) function allows the calling software to emit the provided piece of data through the interface associated with the interface identifier; this is equivalent to producing a token in the formal model 13 of data stream.

The Receive function (service identifier, interface identifier) allows the calling software to look up the data sent through the interface associated with the identifiers since the last call to Receive; this is equivalent to the consumption of as many tokens as data consulted in the formal model 13 of data stream.

The Request (service identifier, interface identifier, parameters) function allows the calling software to send a processing request associated with the interface identifier to the software associated with the service identifier, for processing the given parameters, and to retrieve a possible result once the request has been processed; this is equivalent to the production of a token in the formal model 13 of data stream, and the retrieval of the result is equivalent to the consumption of a token.

The function Process (interface identifier) allows the calling software to retrieve parameters of a request received on the identified interface, to perform the required processing, and eventually to emit a result to the software that sent the request; retrieving the request is equivalent to consuming a token in the formal model 13 of data stream, while emitting a result is equivalent to producing a token.

Figure 3A:
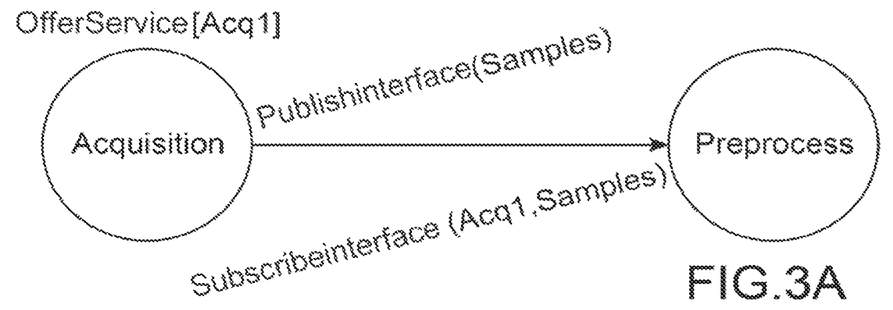
FIGS. 3A-3C schematically illustrate correspondence between actors of the formal model and description of service-oriented interfaces of the communication specification, according to one embodiment of the invention.
Figure 3B:
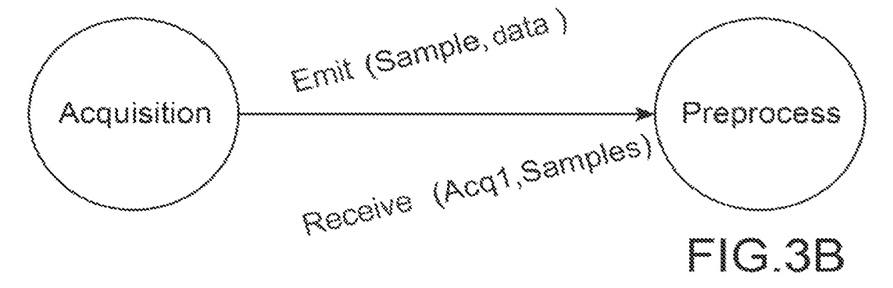
Figure 3C:
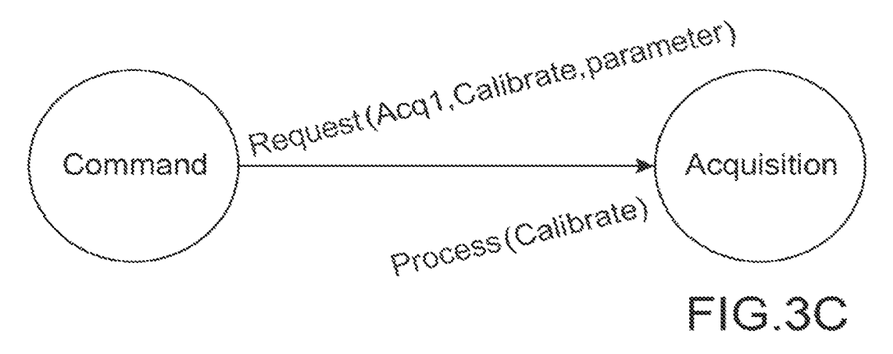

FIGS. 3A-3C schematically illustrate the correspondence between actors of the formal model and the description of the service-oriented interfaces of the communication specification, according to one embodiment of the invention.

More particularly, FIG. 3A shows the correspondence between the graph topology of the formal model 13 and the service-oriented interfaces for offering a service, publishing an interface, and subscribing to a published interface. For illustrative purposes, in this example only two actors Acquisition a1 and Preprocess a2 are considered. The software Acq1 which performs the behaviour of the Acquisition a1 actor will publish Publishinterface(Smples) interfaces corresponding to the acquisition service. More particularly, the software Acq1 will call the OfferService function and then it will call the PublishInterface function creating a connection port on which the data will be published. Then, the software Pre1 implementing the Preprocess actor a2 will call the SubscribeInterface function to subscribe to the interface of the software Acq1 in order to consume the produced samples. FIG. 3A thus makes the connection between these different elements and allows the data stream graph to be redrawn as the calls to the functions are done. It will be noted that FIG. 3A relates to an initialisation phase for verifying that the communications actually correspond to the graph of the formal model 13 of FIG. 2. Once the graph is constructed, a second operating phase described by FIG. 3B begins.

Indeed, FIG. 3B shows the correspondence between the production/consumption on a channel of the graph of the formal model 13 and the data emission/reception on a service-oriented interface. Software Acq1 will regularly call the Emit function on its interface and it will provide a concrete piece of data on this interface. The software Pre1 implementing the Preprocess actor will call the Receive function to consume this piece of data.

FIG. 3C shows the correspondence between production/consumption on a channel of the graph of the formal model 13 and sending a request and processing on a service-oriented interface. More particularly, the software Com1 implementing the Command actor sends a request with parameters and the request identifier, which corresponds to the production of a token in the graph of the formal model of FIG. 2. On the other hand, the software Acq1 of the Acquisition actor will call the Process function to process the request on its interface.

The expected behaviour for the actor implementations in the example of FIGS. 3A-3C is as follows:

Acq1: with the configuration described above, the example formal model 13 in FIG. 2 determines that the Acquisition actor has three successive activations such that the first one has to take place between 0 ms and 20 ms, has to produce a token on its output channel and consume a token on its input channel. The next two activations do not communicate. Thus, the expected behaviour for the implementation is to call the Emit function on the AcquisitionService::Samples interface once and to call the Process function in order to process a request for the AcquisitionService::Calibrate interface between 0 ms and 20 ms. This behaviour has to be repeated between 100 ms and 120 ms, 200 ms and 220 ms, etc.

Pre1: with the configuration described above, the example of formal model 13 in FIG. 2 determines that the Preprocess actor has an activation that has to take place between 0 ms and 50 ms, has to consume a token on its input channel and produce a token containing data on one of the output channels, and a token containing no data on the other channel. To take possible reconfigurations into account, this implementation verifies whether the implementation Proc2 has called the OfferService function. Thus, the expected behaviour for the implementation is to call the Receive function on the Samples interface of Acq1 in order to look up a piece of data, and to call the Send function once either on its Samples1 interface or on its Samples2 interface, between 0 and 50 ms. This behaviour has to be repeated between 100 ms and 150 ms, 200 ms and 250 ms, etc.

Proc1: With the configuration described above, the example of formal model 13 in FIG. 2 determines that the Fast Process actor has an activation that has to consume a token on its input channel and produce a token on its output channel, this token containing either data or no data. Thus, the expected behaviour for this implementation is to call the Receive function on the Samples1 interface of Pre1 in order to look up one or zero piece of data, and to call the Emit function on its Samples interface once, and only if data has actually been received, and this between 0 and 90 ms. This behaviour has to be repeated between 100 ms and 190 ms, 200 ms and 290 ms, etc.

Proc2: the expected behaviour is the same as Proc1 except that the interface for Receive is the Samples2 interface of Pre1.

Com1: with the configuration described above, the example of formal model 13 in FIG. 2 determines that the Command actor has an activation that has to consume a token containing data on one of its input channels, and a token containing no data on the other, to produce a token on its output channel. Thus, the expected behaviour for this implementation is to call the Receive function on the Samples interface of Proc1 and Proc2, so as to look up a piece of data on either of them, and optionally to call the request function on the Calibrate interface once, between 0 ms and 110 ms. This behaviour has to be repeated between 100 ms and 210 ms, 200 ms and 310 ms, etc.

Once the description of an actor is defined, the supervisory module 11 takes this description as input and verifies that a call sequence to the service-oriented communication functions is in accordance with the expected behaviour of the actor.

It will be noted that the supervisory module 11 can be implemented according to different techniques using, for example, automata, trees, lists, code choices with nested conditions, regular expressions with a grammar, etc.

However, in the following description, a code generation technique based on automata is considered as an example. Thus, the supervisory module 11 constructs an automaton describing the expected behaviour for the implementation, in which the transitions correspond to a call to one of the communication functions described above.

More particularly, the supervisory module 11 is configured to construct an automaton for each software implementation corresponding to an actor, each automaton comprising a set of states whose transition from one state to another is triggered by a call from the software implementation to one of the communication functions. The automaton relies on the behaviour expected by the formal model to trace valid call sequences to the communication functions of the software implementation.

An example of the construction of such an automaton would be that of an automaton divided into two parts, one corresponding to the initialisation of the software implementation, the other to its operation once initialised, connected by a transition allowed only after the synchronised start of the platform.

Figure 4A:
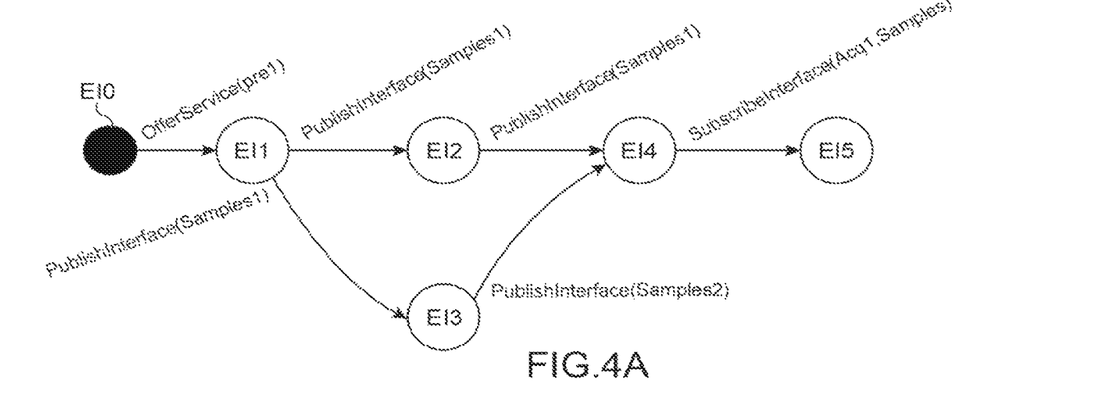
FIGS. 4A and 4B schematically illustrate the construction of an automaton, according to one embodiment of the invention.
Figure 4B:
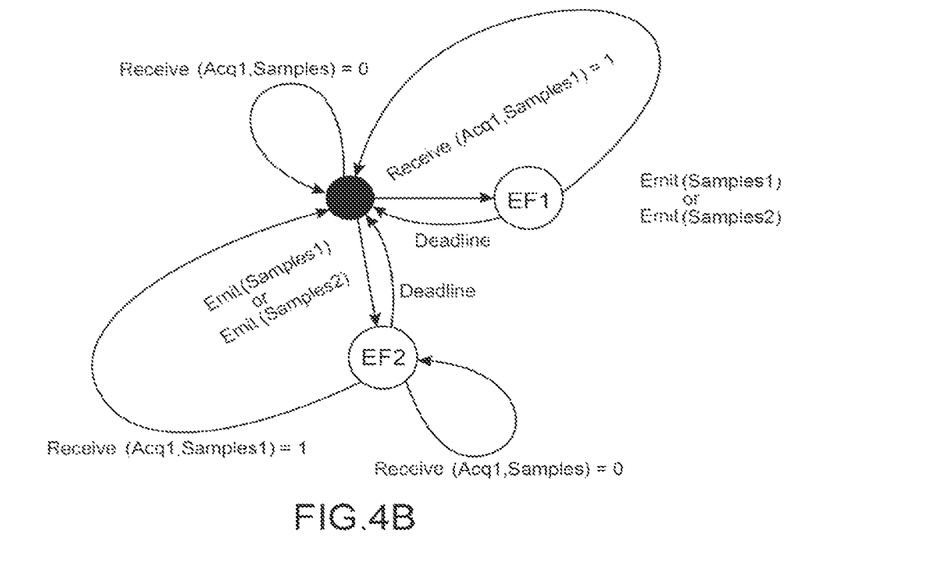

Indeed, FIGS. 4A and 4B schematically illustrate the construction of the first and second parts of an automaton, according to one embodiment of the invention.

More particularly, FIG. 4A shows the construction of the first part of the automaton. This construction starts from an initial state and arrives at a final state through a number of intermediate states and transitions triggered when:
- the implementation calls the OfferService function with a service identifier associated with this implementation;
- the implementation calls the PublishInterface function with an interface identifier corresponding to the interface of a service for which a call to OfferService has brought to the current state;
- the implementation calls the SubscribeInterface function with an interface and service identifier corresponding to an expected connection to the software associated with that service identifier.

More particularly, the example in FIG. 4A represents the initialisation automaton generated for the implementation Pre 1 of the Preprocess actor $a_2$ in the example in FIG. 2. In the initialisation phase, the implementation is in an initial state EI0 (referred to by a black circle). The automaton can call any function, but until it calls the OfferService function, it is not recognised as the implementation Pre 1 of the Preprocess actor. Once it is identified as the implementation Pre 1 of the Preprocess actor, it can publish either the Samples1 or Samples2 interface to the EI1 state. If it started by publishing the Samples1 interface, it then publishes the Samples2 interface (state EI2). On the other hand, if it started by publishing the Samples2 interface, it then publishes the Samples1 interface (state EI3). Once it has published these interfaces, it can then subscribe to the interface Acq1 (state EI4) and finally, in state EI5, it is considered to have finished.

In this case, a transition from the final state of the first part of the automaton to the initial state of the second part is possible when a synchronisation signal is received by the implementation, indicating the execution of a concrete application on the platform (i.e. indicating a system start).

Furthermore, according to the example in FIG. 4B, the construction of the second part of the automaton starts from an initial state of the second part, and returns to this state through a number of intermediate states and transitions triggered when:
- the implementation calls the Emit function with a previously published interface identifier, and the amount of data already emitted does not exceed that expected for that interface;
- the implementation calls the Receive function with a previously subscribed interface identifier, and the amount of data already received does not exceed that expected for that interface;
- the implementation calls the Request function with a service and interface identifier corresponding to an output channel in the model, and the number of requests already sent does not exceed that expected for this interface;
- the implementation calls the Process function with an interface identifier corresponding to an input channel in the model, and the number of requests already processed does not exceed that expected for this interface;
- the deadline for the current activation has passed.

More particularly, the example in FIG. 4B represents the operating automaton generated for the implementation Pre 1 of the Preprocess actor.

In the initial operating state EF0 (represented by a black circle), the automaton can call the Receive function and as long as it does not receive a sample, it returns to the initial state EF0.

Once it calls the Receive function and receives a sample, the automaton will transition to the state EF1. In the state EF1, the automaton will either transmit a sample on the Samples1 interface or emit a sample on the Samples2 interface before returning to its initial state EF0. However, if in the state EF1, a deadline violation is detected, then the automaton returns directly to its initial state EF0.

On the other hand, if instead of starting with Receive, the automaton starts by calling the Emit function, the automaton will transition to the state EF2. In the state EF2, the automaton will either emit a sample on the Samples1 interface or emit a sample on the Samples2 interface before returning to its initial state EF0. Furthermore, as long as it does not receive a sample, it returns to the state EF2. As before, if in the state EF2 a deadline violation is detected, then the automaton returns directly to its initial state EF0.

Thus, the operating automaton created for the implementation Pre 1 describes sequences of valid communication functions corresponding to the behaviour of its Preprocess actor.

Once this automaton is constructed, the supervisory module generates software elements configured to capture the communication function calls and to make sure that the sequence of calls made upon executing a concrete application corresponds to the sequence defined by the automaton.

The software elements include the following software elements:
- An extended function for each of the communication functions described above. Each time a software call is made, each extended function queries the automaton to determine if there is an outgoing transition from the current state corresponding to that call. If there is such a transition, the extended function makes the call to the original function. If not, the extended function registers a fault if necessary, and returns immediately after fault handling if it allows it. A particular case relates to the Receive function, for which the number of accessed data is not known in advance. The extended version of this function makes sure that, at most, the specified amount of data is available to the application, any additional data is buffered waiting for the next activation when it is made available. Thus, multiple calls to Receive are possible for a single activation, but the number of data looked up never exceeds that specified.
- A function for managing the deadline of input data. At each passage through the initial state, the deadline for receiving input data for the next activation is computed and the function is programmed to be called on that date. If the function is called in this way, it records a fault if necessary and implements the fault handling policy. For example, in the case of the implementation Pre1, the value of the last sample received is made available as if it had been received.
- A function for managing the deadline of the current activation. At each passage through the initial state, the deadline for the next activation is computed and the function is programmed to be called on that date. If the function is called in this way, it updates the current state of the automaton to start a new activation and returns immediately after the fault management if it allows it.

The supervisory module is configured to also generate software in charge of allowing the transition from the initialisation phase to the operation phase of all implementations of the platform. As long as the supervisory module does not authorise the synchronised start-up, the actor implementation software cannot enter the operating phase. This code can, for example, wait for a subset of software to be ready to go into operation, or manage a time deadline. This code relies on existing technologies for time synchronisation between software, generally available on service-oriented software platforms.

Thus, the present invention allows, from a standard programming interface that makes calls to standard functions, to make sure that the calls are made in the correct order and in accordance with the expected behaviour without modifying the programming interface software. This allows an integrator to be supplied by standard software suppliers while using its own methodology.

The present invention is applicable to all data stream systems. A first application relates to real-time critical distributed systems. In particular, a real-time on-board system of equipment, configured to receive measurements specific to the equipment and its environment and to deliver results actuating operations for that equipment to properly operate. The equipment may be an autonomous or non-autonomous vehicle of the land, rail, aerospace or naval type.

In particular, within the scope of a vehicle data stream system, it is advantageous according to the invention to have sensors and processors operating at different frequencies and in different configurations. Furthermore, it can be considered as an example that for a car with a driver, the detection of pedestrians is interesting from a certain speed. Thus, different reconfiguration modes can be used so that the pedestrian detection processing takes place from a certain speed or over a certain range of speeds allowing the microprocessor not to unnecessarily consume execution resources outside this range.

A second application relates to FPGA systems for real-time criticality: an FPGA system is a data stream timed by clocks that trigger processing units, and in which the routing of data can change dynamically.

A third application relates to a system of an industrial process configured for the industrial manufacture of objects according to particular throughput constraints and according to a reconfigurable process. Indeed, an industrial manufacturing method can be seen as a data stream, with flow constraints for technical reasons.

BIBLIOGRAPHIC REFERENCES

1. X. K. Do, S. Louise and A. Cohen, *Transaction Parameterized Dataflow: A model for context-dependent streaming applications*, 2016 Design, Automation & Test in Europe Conference & Exhibition (DATE), Dresden, 2016, pp. 960-965.
2. Haitao Wei, Stéphane Zuckerman, Xiaoming Li, Guang R. Gao, *A Dataflow Programming Language and its Compiler for Streaming Systems*, Procedia Computer Science, Volume 29, 2014, Pages 1289-1298, ISSN 1877-0509.
3. Gustav Cedersjö and Jörm W. Janneck. *Software code generation for dynamic dataflow programs*. In Proceedings of the 17th International Workshop on Software and Compilers for Embedded Systems (SCOPES '14). ACM, New York, NY, USA, 2014, 31-39.
4. Explanation of ara::com API, AUTOSAR AP Release 17-03.
5. Specification of Time Synchronization for Adaptive Platform, AutoSAR AP Release 17-10

The invention claimed is:

1. A system for formally supervising communications of a set of concrete applications of a platform, the system comprising:
   processing circuitry configured to
      acquire a formal model of a data stream comprising a set of actors exchanging quantifiable information with each other through unidirectional communication channels, said formal model describing a behaviour of said set of actors modelling said set of concrete applications, and a communication specification describing software implementations implementing the applications modelled by said actors, said software implementations being configured to make calls to predetermined communication functions relating to a programming interface of said platform, and
      verify that a sequence of calls to said communication functions is in accordance with an expected behaviour of said set of actors,
      wherein the quantifiable information includes a statically specified amount of data to be received on an input channel, a statically specified amount of data to be produced on an output channel, and a time constraint indicating a required time period during which a process of receiving the statically specified amount of data on the input channel and producing the statically specified amount of data on the output channel is to be completed,
      wherein the processing circuitry is configured to construct an automaton for each software implementation corresponding to an actor, each automaton comprising a set of states whose transition from one state to another is triggered by a call from the software implementation to one of said communication functions, said automaton relying on the behaviour expected by the formal model to trace the valid call sequences to said communication functions.

2. The system according to claim 1, wherein each automaton comprises a first part associated with the initialisation of the software implementation and a second part associated with the operation of the software implementation, the transition from a final state of said first part to an initial state of said second part being triggered when a synchronisation signal is received by the software implementation, indicating the execution of a concrete application.

3. The system according to claim 1, wherein the processing circuitry is configured to generate software elements configured to capture calls to communication functions and to make sure that the sequence of calls made upon executing a concrete application corresponds to the sequence defined by the automaton.

4. The system according to claim 3, wherein the software elements comprise an extended function for each of the communication functions, an input data deadline management function, and a current activation management function.

5. The system according to claim 1, wherein the communication specification is a specification of a service-oriented implementation.

6. The system according to claim 1, wherein the communication functions are service-oriented and comprise a service offering function, an interface publishing function, a published interface subscription function, an emitting function, a receiving function, a requesting function, and a processing function on an interface.

7. The system according to claim 1, wherein the formal model comprises a set of configuration data required for the implementation of said actors.

8. The system according to claim 7, wherein the configuration data further comprises for each of the actors: budget, initial delay, initial deadline, input deadline, default input policy, persistent/ephemeral indicator, and strict/relaxed indicator data.

9. The system according to claim 1, wherein the communication specification comprises links between software implementations and actors in the formal model.

10. A real-time on-board equipment, designed using the supervisory system according to claim 1, wherein said on-board equipment is configured to receive measurements specific to its environment and to deliver results actuating functional operations.

11. The equipment according to claim 10, wherein said equipment is an autonomous or non-autonomous vehicle of a land, rail, aerospace or naval type.

12. A method for formally supervising communications of a set of concrete applications, the method comprising:

acquiring a formal model of a data stream comprising a set of actors exchanging quantifiable information with each other through unidirectional communication channels, said formal model describing a behaviour of a set of actors modelling said set of concrete applications, and a communication specification describing software implementations implementing the applications modelled by said actors, said software implementations being configured to make calls to predetermined communication functions relating to a programming interface of said platform, and verifying that a sequence of calls to said communication functions is in accordance with an expected behaviour of said set of actors, wherein the quantifiable information includes a statically specified amount of data to be received on an input channel, a statically specified amount of data to be produced on an output channel, and a time constraint indicating a required time period during which a process of receiving the statically specified amount of data on the input channel and producing the statically specified amount of data on the output channel is to be completed, wherein the method includes constructing an automaton for each software implementation corresponding to an actor, each automaton comprising a set of states whose transition from one state to another is triggered by a call from the software implementation to one of said communication functions, said automaton relying on the behaviour expected by the formal model to trace the valid call sequences to said communication functions.

* * * * *